Aug. 15, 1950 R. C. CHEEK 2,519,223

MULTIPLIER

Filed June 11, 1948 2 Sheets-Sheet 1

WITNESSES:

Robert C. Spira

E. F. Oberheim

INVENTOR

Robert C. Cheek.

BY

Paul E. Friedemann

ATTORNEY

Aug. 15, 1950 R. C. CHEEK 2,519,223

MULTIPLIER

Filed June 11, 1948 2 Sheets-Sheet 2

WITNESSES:
Robert C. Baird
E. L. Oberheim

INVENTOR
Robert C. Cheek.
BY
Paul E. Friedemann
ATTORNEY

Patented Aug. 15, 1950

2,519,223

UNITED STATES PATENT OFFICE 2,519,223

MULTIPLIER

Robert C. Cheek, Irwin, Pa., assignor to Westinghouse Electric Corporation, East Pittsburgh, Pa., a corporation of Pennsylvania Application June 11, 1948, Serial No. 32,281

10 Claims. (Cl. 235—61)

This invention relates generally to electrical devices for performing certain mathematical operations and more in particular to an electrical system for multiplying a plurality of electrical quantities.

It is essential in the multiplication of electrical quantities that the resulting product shall be accurate. Devices of this general type involving electronic circuits have been used in the past. Most of these have been based on direct multiplication of two input functions in vacuum tube circuits with supposedly square-law characteristic curves. Although some available vacuum tubes have characteristic curves approaching the required parabolic shape, third and higher order curvature is present in all in sufficient magnitude to introduce an undesirable amount of distortion and inaccuracy in the resulting product.

Devices of this general type are required in electrical analogue computers, in the solution of non-linear equations. Devices of this general type are also useful in making power measurements wherein element voltages, one representative of the voltage component of the power to be measured and the other representative of the current component of the power to be measured, are applied to the electronic circuits. As will be hereinafter shown, this invention is applicable both in the measurement of alternating-current power as well as direct-current power.

Generally, it is an object of this invention to provide a multiplier which is simple in its components and accurate in operation.

More specifically, it is an object of this invention to provide an electronic multiplier which is free of errors due to undesirable orders of curvature in characteristics of circuit elements employed.

The foregoing statements are merely illustrative of the various aims and objects of this invention. Other objects and advantages will become apparent upon a study of the following disclosure when considered in conjunction with the accompanying drawings in which.

In a presently preferred embodiment of this invention, instead of being multiplied directly in vacuum tube circuits, the quantities are multiplied in turn by an auxiliary or carrier wave of a frequency which is high in comparison with the highest frequency component of the expected product and the resulting signal or wave demodulated to obtain the product of the quantities. The use of a carrier wave in this manner permits spurious outputs due to undesired orders of curvature in the tube characteristics to be largely eliminated by conventional tube circuits which are tuned to the order of frequency of the true product of the input functions by the carrier wave. Spurious responses appear as harmonics of the carrier frequency and as harmonics and intermodulation products of the components of the input functions and are bypassed in tuned circuits.

Figure 1:
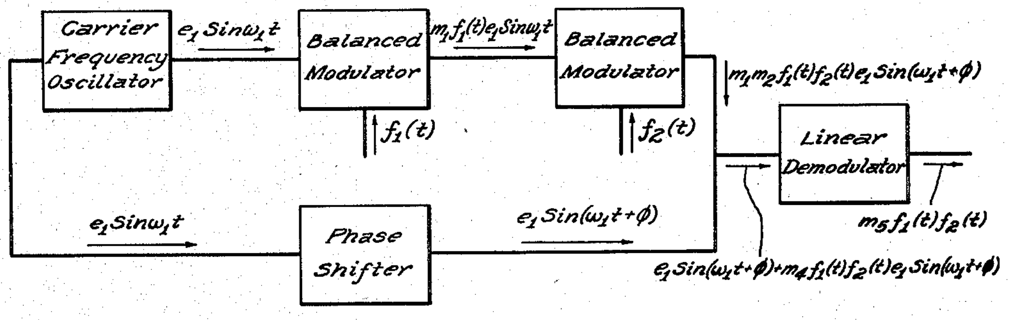
Figure 1 is a block diagram of a multiplier embodying the principles of this invention.

In the block diagram of Fig. 1, the carrier frequency oscillator produces the carrier signal. This signal is applied to a balanced modulator to which the first input function designated $f_1(t)$ is applied. The output of this modulator is applied to a second balanced modulator to which the second input function designated $f_2(t)$ is applied. The output of the second balanced modulator plus a carrier signal of peak amplitude greater than the peak amplitude of the output of the second balanced modulator is applied to a linear demodulator in which the carrier signal component, appearing as a multiple with the multiplied functions, is eliminated and the output of the linear demodulator is represented in the product of the two input functions and a proportionality constant depending upon the amplification characteristics of the electronic components of the system. If the output of the second balanced modulator is noted to have been shifted in phase by an amount $\phi$, in which case its output may be written as $m_1m_2f_1(t)f_2(t)e_1 \sin(\omega_1t+\phi)$, a phase shifter excited by the carrier frequency oscillator having a range of from 0° to 180° of phase shift of the carrier signal may be utilized to shift the phase of the carrier signal combined with the output of the second balanced modulator in the input to the linear demodulator, to provide the necessary degree of phase shift inducted by $e_1 \sin(\omega_1t+\phi)$ to correct the unwanted phase shift of the output of the second balanced modulator giving a combined signal $e_1 \sin(\omega_1t+\phi)+m_4f_1(t)f_2(t)e_1 \sin(\omega_1t+\phi)$.

Figure 2:
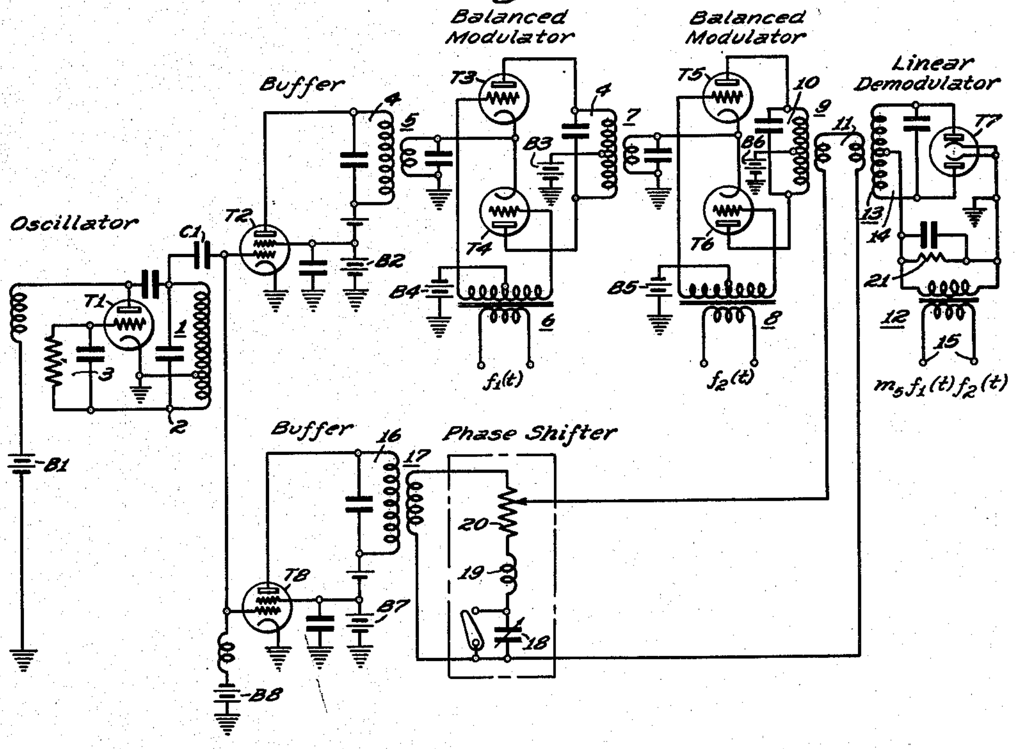
Fig. 2 is a detailed circuit system of the block diagram system of Fig. 1.

In Fig. 2 of the drawings, the details of the electronic elements in the blocks of Fig. 1 are illustrated. The oscillator is a conventional oscillator, for instance of the Hartley type, and includes an amplifier tube T1 having a battery B1 and a tuned output circuit 1. A portion of the output voltage of this oscillator between the terminal 2 and ground is applied through a grid leak 3 to the grid of the tube T1 approximately 180° out of phase with the output voltage existing across the load impedance in the plate circuit of the amplifier and of sufficient magnitude to produce the output power necessary to develop the input voltage.

The output of the oscillator in this system is applied to the grid of a tube T2 by means of a capacitor C1. The tube T2 forms part of a buffer stage which may be considered a portion of the oscillator and is included to prevent currents in the modulator and demodulator circuits from reacting upon the oscillator frequency and amplitude. The output of the buffer stage includes a tuned circuit 4, part of which is formed by the primary of the transformer 5. Plate supply for this buffer stage is furnished by the battery B2 and grid bias by a battery B8.

The output of the buffer stage appearing in the transformer 5 is applied to both of the grids of the tubes T3 and T4 of the balanced modulator. This is a conventional balanced modulator circuit. The input function $f_1(t)$ is also applied to the grids of the tubes T3 and T4 in a circuit including the transformer 6. By reason of the circuit connections, the carrier voltage or signal appearing in the transformer 5 is applied in in-phase relation to both of the grids of the tubes T3 and T4 while the input function $f_1(t)$ controls the grids of these tubes in opposite senses. A predetermined grid bias is applied by the battery B4 through the center tap of the secondary of the transformer 6 while the plate supply for the tubes T3 and T4 is supplied by a battery B3 to the center tap of the primary of a transformer 7, forming part of a tuned output circuit 4. The secondary winding of the transformer 7 is connected to the grids of the tubes T5 and T6 of the second balanced modulator in the same manner as the secondary of the transformer 5 of the first balanced modulator. Similarly, the input function $f_2(t)$, which is to be multiplied with the other input function $f_1(t)$, controls the grids of the tubes T5 and T6 in opposite senses through circuit connections afforded by the transformer 8. Grid bias for both tubes is supplied by the battery B5 through the center tap connection of the secondary winding of transformer 8, and plate voltage is applied by the battery B6 through the center tap connection of the primary winding of transformer 9 forming part of the tuned output circuit for the tubes T5 and T6 of the second balanced modulator. A link coupling 11 connects the output of the second balanced modulator to the linear demodulator which is also of conventional design. This circuit includes a double diode T7 and an output circuit including a transformer 12 connected between the cathodes of the tubes T7 and a center tap of the winding 13 of the tuned circuit 14. The multiple of the two functions $f_1(t)$ and $f_2(t)$ appears across the terminals 15 of the secondary of the transformer 12.

The link coupling 11 affords means for applying a carrier wave from the phase shifter, shifted in phase if necessary, to compensate the phase shift of the signal appearing in the output of the second balanced modulator. The phase shifter circuit is isolated from the oscillator by a buffer circuit, the same as that connecting the oscillator and the first balanced modulator. This circuit includes the tube T8, grid bias for both of the tubes T2 and T8 of the buffer stages being furnished by a battery B8. The output circuit of this buffer stage also includes a tuned circuit 16 including the primary of a transformer 17 which couples the output of the buffer circuit to the phase shifter circuit and plate voltage is furnished by a battery B7.

The phase shifter circuit is comprised of a simple loop circuit including the secondary winding of the transformer 17, an adjustable capacitor 18, an inductor 19, and an adjustable resistor 20. The constants of this circuit are selected to afford impedance adjustments by means of capacitor 18 and a resistor 20 to provide a phase shift of the carrier signal over the range of 0° to 180°. The output of the phase shifter is applied across the link coupling, and is, therefore, combined with the output of the second balanced modulator in the input to the linear demodulator circuit.

Referring now to both Figs. 1 and 2 for a general discussion of the operation of the system, assume the oscillator produces the carrier frequency $e_c \sin \omega_1 t$. This wave is fed through the first buffer stage to the balanced modulator wherein the first input function $f_1(t)$ is used as the modulating signal. Balanced modulators are widely used in the carrier telephone art to produce an amplitude-modulated signal in which the carrier-frequency wave is suppressed leaving the sideband components only of the corresponding amplitude-modulated signal at the output. The carrier voltage is applied to the grids of the two modulated amplifiers T3 and T4 in the same phase while the modulating voltage is applied in opposite phase to the two grids by means of the center tapped transformer 6. The outputs in the plate circuits of the two tubes are combined through the transformer 7, the primary of which is center tapped in such a way that voltages applied to the two grids in the same phase cancel each other in the output, while voltages applied to the two grids 180° out of phase will add in the output. The result is that the carrier voltage which is applied to the two tubes in the same phase does not appear in the secondary of the output transformer, whereas the sideband components which are produced in opposite phase are added to give an output that is a modulated wave from which the carrier component has been removed.

Reference to the theory of amplitude modulation shows that this corresponding amplitude-modulated signal could be expressed as $$e_1[1+m_1f_1(t)] \sin \omega_1 t = e_1 \sin \omega_1 t + m_1 f_1(t) e_1 \sin \omega_1 t \quad (1)$$

which contains the original carrier and the sideband frequencies. The balanced modulator, the output of which is the sideband frequencies only with the carrier suppressed is therefore, $$m_1 f_1(t) e_1 \sin \omega_1 t \quad (2)$$

which is the product of the original carrier wave and the first input function $f_1(t)$. The quantity $m_1$ is a proportionality constant which may be construed as representing the amplification properties of the system components to this point.

The output of the first balanced modulator is of the same order of frequency as the original carrier wave and is used as the carrier wave in the second balanced modulator to which the second input function $f_2(t)$ is applied as the modulating signal. The resulting output, which again is proportional to the product of the modulating function by the carrier wave with the carrier wave itself suppressed and assuming no phase shift, is $$m_1 m_2 f_1(t) f_2(t) e_1 \sin \omega_1 t \qquad (3)$$

It can be seen that the output of the second balanced modulator is proportional to the output that would be obtained from a single balanced modulator if the product of the two input functions $f_1(t) f_2(t)$ had been used as the modulating signal. Furthermore, if a carrier wave of the proper phase position and of peak amplitude greater than the peak amplitude of the output of the second modulator is added to the output of the second modulator, a resulting wave will be obtained which will be of the form $$m_3 e_1 \sin \omega_1 t + m_1 m_2 f_1(t) f_2(t) e_1 \sin \omega_1 t \qquad (4)$$

which may be expressed as $$e_1[1 + m_4 f_1(t) f_2(t)] \sin \omega_1 t \qquad (5)$$

which is identical in every way to an amplitude-modulated carrier wave, modulated by the product of the two input functions. In writing Expression 5, the proportionality constant $m_3$ of Expression 4 has been assumed to be unity, and the proportionality constant $m_4$ bears the same relationship to unity as the product of the proportionality constants $m_1$ and $m_2$ bear with respect to the proportionality constant $m_3$.

As shown in the drawings, therefore, the wave resulting from the addition of the original carrier wave (shifted in phase by the phase shifter to compensate for any constant phase shift occurring in the modulator circuits) and the output of the second modulator is applied to a linear demodulator or detector of a type conventionally used in the demodulation of amplitude-modulated waves. The output of the demodulator is the desired product $f_1(t) f_2(t)$ multiplied by a proportionality constant $m_5$, the magnitude of which is known from the characteristics of the system. Although the phase shifter represents a convenient method of compensating phase shift in the electronic circuits it is not to be regarded as an indispensable component of the system. The need for the phase shifter can be eliminated through proper design and adjustment of the system. Compensation for unwanted phase shift $\phi$ by means of the phase shifter is shown in the drawings.

If it is desired to measure the power in an alternating-current circuit, the input function $f_1(t)$, for example, will be of a value representative of the voltage of the system; and the input function $f_2(t)$ will be a voltage representative of the current of the system. The output of the linear demodulator may then be measured across a load resistance such as 21, the transformer 12 being eliminated. The change in D. C. voltage across the load resistance 21 will then represent the power of the alternating-current system.

If direct-current power is to be measured, the transformers 6 and 8 in the input, respectively, to the first and second balanced modulators, may be eliminated and the voltages $f_1(t)$ and $f_2(t)$ one of which corresponds to the voltage and the other to the current are applied directly across the respective pairs of grids of the two balanced modulators. Again the output of the linear demodulator may be measured as described in the preceding paragraph to obtain an indication of the direct-current power.

To further illustrate the application of this invention, reference may be made to problems existing in non-linear circuits. These include the analysis of circuits with saturable reactors, transformer inrush current problems, and the analysis of circuits with non-linear resistors to mention a few. By the various electrical analogies to other physical systems, such as mechanical vibrating systems, heat flow, etc., the non-linear elements of these other systems can be represented by suitable electrical components and the range of application thereby extended. An arbitrary function which might represent the variation of an impedance with the current flowing through it or the voltage across it, can be represented to sufficient accuracy by a finite number of terms of a power series. In most instances, two or three terms of the power series are sufficient for practical purposes.

For instance, consider the problem of the non-linear resistor mentioned above. The variation of the resistance of which, with the current flowing through it, is defined by $$R(i) = R_0(1 \pm a_1 i \pm a_2 i^2 \pm a_3 i^3 \pm \ldots) \qquad (6)$$

Then the voltage across such a resistor is $$E = R(i) \times i = R_0 i \pm R_0 a_1 i^2 \pm R_0 a_1 i^2 \pm R_0 a_3 i^4 \pm \ldots \qquad (7)$$

Figure 3:
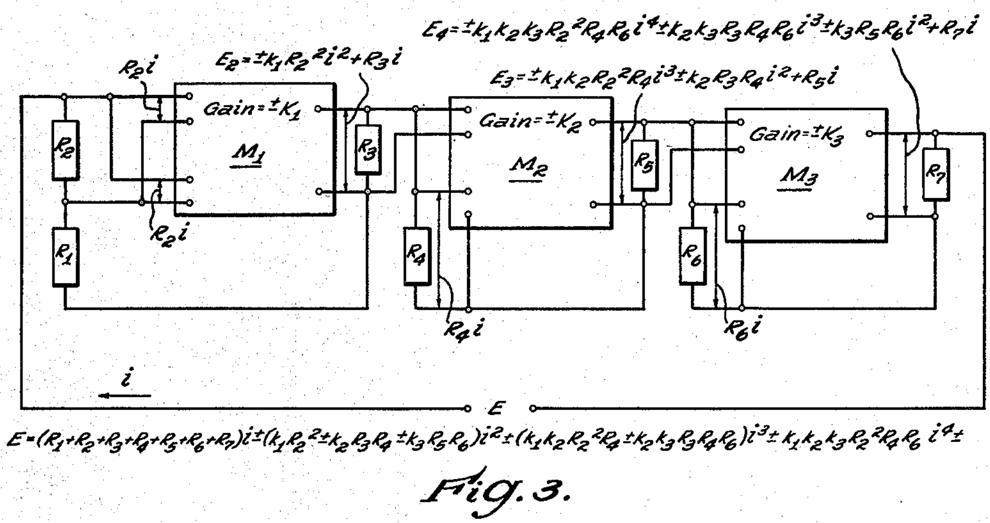
Fig. 3 is a block diagram illustrating the application of the multipliers in representing a non-linear mathematical expression expanded into a power series.

The system that will represent this self-impedance is shown in Fig. 3, and it is arranged to represent the power series of Equation 7 above, term by term.

Figure 4:
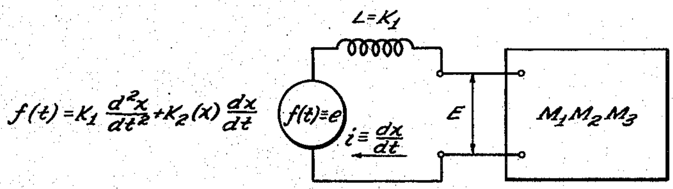
Fig. 4 illustrates the application of this invention in the solution of a typical non-linear differential equation.

The circuit network of Fig. 3 and also that of Fig. 4 illustrating the application of the network of Fig. 3 in the solution of a typical problem correspond essentially to Figs. 4 and 5, respectively, of the co-pending application of G. D. McCann, Serial No. 700,130, filed September 28, 1946, entitled "Analyzer" and assigned to the same assignee as this invenion. This subject matter is included only for the purpose of illustrating an application of this invention so that the invention may be more readily understood, and reference may be made to the mentioned copending application wherein this subject matter is claimed for further applications and details.

The circuit network of Fig. 3 includes the three multipliers $M_1$, $M_2$ and $M_3$ which may each be of the type specifically referred to in Figs. 1 and 2; and for the purpose of this illustration, let it be assumed that a current $i$ is circulated in the network from some external circuit. Such an external circuit may form a part of the complete network including such analogy circuit as may be necessary for the particular problem to be considered and to which the voltage E is to be applied. This will be considered hereinafter. The multipliers are connected in a circuit network so the output of the first is applied to the second, etc., and the network may be extended to include any number of terms of a power series, within practical limits of course. Resistors $R_3$, $R_5$ and $R_7$, respectively connected across the outputs of multipliers $M_1$, $M_2$ and $M_3$, may or may not be utilized in the circuit connections. They may be considered to represent the output impedance of the respective amplifiers or as being physically connected in the manner illustrated. Their use will depend upon the circuit constants needed for proper performance or to form the desired constants of the individual terms of the power series.

For the purpose of this illustration, only the case in which the resistance of the various resistors indicated is appreciable will be considered. Therefore, the resistance values may not be neglected. The first voltage is produced by the current $i$ flowing in the circuit loop including resistors $R_1$, $R_2$, $R_3$, $R_4$, $R_5$, $R_6$, and $R_7$. Thus, the first voltage $E_1$ may be written $$E_1=(R_1+R_2+R_3+R_4+R_5+R_6+R_7)i \quad (8)$$

The second voltage appears across the output of the multiplier $M_1$ which multiplies the voltage drop across the resistor $R_2$ caused by the current $i$ and which is applied to each of its two input terminals as indicated. The product voltage is, therefore, $\pm K_1R_2^2i^2$ and the second voltage considering the drop across $R_3$ caused by current $i$ thus becomes $$E_2=\pm K_1R_2^2i^2+R_3i \quad (9)$$

This voltage is impressed across the upper pair of input terminals of the multiplier $M_2$. The current $i$ flowing through the resistor $R_4$ produces a voltage drop expressed by $R_4i$ which is applied to the lower pair of input terminals on the amplifier $M_2$ and the third voltage $E_3$ becomes $$E_3=\pm k_1k_2R_2^2R_4i^3\pm k_2R_3R_4i^2+R_5i \quad (10)$$

In a similar manner the product of voltages $E_3$ and $R_6i$, which are respectively applied to the input terminals of the multiplier $M_3$ and which forms the fourth voltage of the series, is expressed as a voltage $E_4$ which is $$E_4=\pm k_1k_2k_3R_2^2R_4R_6i^4\pm k_2k_3R_3R_4R_6i^3\pm k_3R_5R_6i^2+R_7i \quad (11)$$

The voltage E may now be written, upon collecting the terms, as $$E=(R_1+R_2+R_3+R_4+R_5+R_6+R_7)i\pm (k_1R_2^2\pm k_2R_3R_4\pm k_3R_5R_6)i^2\pm (k_1k_2R_2^2R_4\pm k_2k_3R_3R_4R_6)i^3\pm k_1k_2k_3R_2^2R_4R_6i^4 \quad (12)$$

in which the constant $$(R_1+R_2+R_3+R_4+R_5+R_6+R_7)$$

corresponds to the constant $R_0$ of Equation 7 above; the constant $(k_1R_2^2\pm k_2R_3R_4\pm k_3R_5R_6)$ corresponds to the constant $R_0a_1$ in Equation 7, etc. It should be noted that $R_2$, $R_4$ and $R_6$ may be only one resistor as all voltages may be taken from the single resistor $R_2$ under certain conditions. The constants may be lumped, in which case $$E=K_1i\pm K_2i^2\pm K_3i^3\pm K_4i^4\pm \ldots \quad (13)$$

The application of the multiplier network of Fig. 3 in the solution of a typical problem is illustrated in Fig. 4. Consider the differential equation $$f(t)=k_1\frac{d^2x}{dt^2}+k_2(x)\frac{dx}{dt} \quad (14)$$

where, to continue the discussion in terms of the illustration of Fig. 3, $$k_2(x)\frac{dx}{dt}$$

will be assumed to represent the non-linear characteristic of the resistor and $k_2(x)$ being defined by $$K_2(x)=R(i)=R_0(1\pm a_1i\pm a_2i^2\pm a_3i^3\pm \ldots) \quad (15)$$

Then setting $$i=\frac{dx}{dt}, k_2(x)\frac{dx}{dt}$$

may be written $$k_2(x)\frac{dx}{dt}\equiv R(i)\times i=R_0i\pm R_0a_1i^2\pm R_0a_2i^3\pm R_0a_3i^4\pm \ldots \quad (16)$$

The circuit for solving Equation 14 is shown in Fig. 4 in which the network of Fig. 3 is represented as a block designated $M_1M_2M_3$. In this analogy, the first term of Equation 14

$$k_1\frac{d^2x}{dt^2}$$

is represented in the inductor L, the inductance of which is proportional to $k_1$ as indicated. This is arranged in conjunction with the network $M_1M_2M_3$ to form a simple loop circuit excited by a voltage $e$ which is proportional to $f(t)$ and the current $i$ is proportional to $$\frac{dx}{dt}$$

as shown above. The voltage $e$ represents the physical quantity or forcing function which excites the physical system being considered and may be produced in any manner suitable for the application. Means for producing suitable forms of excitation functions are covered in U. S. Patent 2,420,891, to G. D. McCann, and assigned to the same assignee as this invention. The current $i$ circulates through the analogy circuit flowing through the multiplier network as indicated in Fig. 3 and produces the various functions across the resistors which are multiplied in the multiplying components of the network together with other quantities employed in the power series defining the voltage of Equation 12. The voltage $e$ used to excite the system, as pointed out above, may be produced by any of the methods discussed in the mentioned patent and may represent a single or a multiplicity of components or other type of variables depending upon the character of the function to be represented.

While the foregoing disclosure has been concerned with multiplication of two functions, it will be appreciated that the multiplying network may be extended to include any number of functions required for a particular problem. Additionally, it is not to be construed from the single application discussed in Figs. 3 and 4 that the invention is limited entirely to applications in computer systems; it may be employed in any application wherein quantities are to be multiplied. Further the invention may be practiced with other than electronic components. As an example dry disc rectifying may be employed to form a balanced modulator circuit.

I claim as my invention:

1. Apparatus for multiplying a pair of quantities comprising, in combination, a pair of balanced modulators connected so that the output of the first controls the second, circuit means for applying a carrier signal to the first balanced modulator, means for applying a modulating voltage to said first balanced modulator representative of one of said pair of quantities, means for applying a modulating voltage to said second balanced modulator representative of the other of said pair of quantities, and circuit means for demodulating the output of the second balanced modulator.

2. Apparatus for multiplying at least two voltages comprising, in combination, circuit means for producing a carrier signal, circuit means for producing a product of said carrier signal and one of said voltages, circuit means for producing a product of said carrier signal, said one voltage and the other of said voltages, and circuit means for eliminating said carrier signal from the last mentioned product.

3. Multiplying apparatus comprising, in combination, an oscillator, a first balanced modulator controlled by said oscillator, a second balanced modulator controlled by said first balanced modulator, a linear demodulator connected to receive the output of the second balanced modulator, means for applying one of two voltages to be multiplied to the first balanced modulator and means for applying the remaining of the two voltages to be multiplied to the second balanced modulator, each of said voltages being applied as modulating signals.

4. Multiplying apparatus comprising, in combination, a pair of normally balanced electrical circuits, an exciting circuit for applying an excitation component to one of said pair of normally balanced circuits, circuit means connecting the other of said pair of normally balanced electrical circuits to be excited by the output of said one electrical circuit, means for applying a first quantity of a pair of electrical quantities to be multiplied to said one normally palanced electrical circuit to unbalance said circuit, means for applying the second quantitiy of said pair of quantities to be multipled to said other of said pair of normally balanced electrical circuits to unbalance said other circuit, and means for eliminating the excitation component from the output of said other normally balanced electrical circuit.

5. Multiplying apparatus comprising, in combination, a first electrical circuit comprising a pair of electrically opposed parallel paths, means for applying an alternating voltage in in-phase relation to each of said parallel paths, circuit means for applying a first voltage of a pair of voltages to be multipled in 180° phase relation to each of said parallel paths, a second electrical circuit comprising a pair of electrically opposed parallel paths, circuit means connecting said second electrical circuit to said first electrical circuit to be energized by the combined output of the parallel paths of the first electrical circuit, said energization of said second electrical circuit being applied in in-phase relation to each of the parallel paths of the second electrical circuit, circuit means for applying the second of said pair of voltages in 180° phase relation to the parallel paths of said second electrical circuit, and circuit means responsive to the combined output of said parallel paths of said second electrical circuit for eliminating the component of said alternating voltage from the output voltage of said second electrical circuit.

6. The method of multiplying at least two electrical quantities which comprises the steps of, modulating a carrier voltage as a function of one of said electrical quantities to be multiplied and suppressing the carrier voltage, modulating the resulting electrical quantity as a function of the second of said two electrical quantities and suppressing said resulting electrical quantity, and thereafter demodulating the electrical quantity resulting from the second modulation to eliminate the carrier voltage from the electrical quantity resulting from the second modulation.

7. The method of multiplying at least two electrical quantities which comprises the steps of, modulating a carrier voltage in dependence of one of said two electrical quantities to be multiplied to produce a first electrical quantity representative of the product of said carrier voltage and said one electrical quantity, modulating said first electrical quantity in dependence of the other of said two electrical quantities to produce a second electrical quantity which is representative of the product of said carrier voltage, said one electrical quantity and said other electrical quantity, and thereafter eliminating said carrier voltage from said second electrical quantity.

8. The method of multiplying a pair of alternating voltages which comprises the steps of, producing a carrier wave which is higher in frequency than the highest expected frequency component of the expected product of said alternating current voltages, modulating said carrier wave by one of said pair of alternating current voltages to produce a first modulated signal which is the product of said carrier wave and said one alternating current voltage, modulating said first modulated signal by the other of said pair of alternating current voltages to produce a second modulated signal which is the product of said carrier wave, said one alternating current voltage and said other alternating current voltage; and thereafter demodulating said second modulated signal to eliminate the carrier wave therefrom.

9. Apparatus for multiplying a pair of voltages comprising, in combination, an oscillator, a first balanced modulator comprising a pair of parallel connected tubes each having an anode, a cathode and a control grid, circuit means for applying the output signal of said oscillator in the same phase to the control grid of each of said tubes, circuit means for applying one of said pair of voltages as a modulating voltage in opposite phase to the control grids of said tubes, a second balanced modulator circuit including a pair of parallel connected tubes each having an anode, a cathode and a control grid, circuit means for applying the output of the first balanced modulator in the same phase to the control grid of each tube of the second balanced modulator, circuit means for applying the other of said pair of voltages as a modulating voltage in opposite phase to the control grids of the tubes of the second balanced modulator, and a linear demodulator connected to the output of the second balanced modulator and constructed and arranged to eliminate the component of the oscillator signal appearing in the output voltage of the second balanced modulator.

10. Apparatus for multiplying a pair of voltages comprising, in combination, an oscillator, a first balanced modulator comprising a pair of parallel connected tubes each having an anode, a cathode and a control grid, circuit means for applying the output signal of said oscillator in the same phase to the control grid of each of said tubes, circuit means for applying one of said pair of voltages as a modulating voltage in opposite phase to the control grids of said tubes, a second balanced modulator circuit including a pair of parallel connected tubes each having an anode, a cathode and a control grid, circuit means for applying the output of the first balanced modulator in the same phase to the control grid of each tube of the second balanced modulator, circuit means for applying the other of said pair of voltages as a modulating voltage in opposite phase to the control grids of the tubes of the second balanced modulator, a linear demodulator, a coupling circuit connecting said linear demodulator to the output of said second balanced modulator, said linear demodulator being constructed and arranged to eliminate the component of the oscillator signal appearing in the output of the second balanced modulator, a phase shift circuit connected to said coupling circuit, and circuit means for applying the output signal of said oscillator to said phase shift circuit.

ROBERT C. CHEEK.

REFERENCES CITED

The following references are of record in the file of this patent:

UNITED STATES PATENTS

| Number | Name | Date |
| --- | --- | --- |
| 2,425,405 | Vance | Aug. 12, 1947 |
| 2,433,236 | Rajchman | Dec. 23, 1947 |